United States Patent
Liu

(10) Patent No.: US 10,277,081 B2
(45) Date of Patent: Apr. 30, 2019

(54) WIRELESS ENERGY TRANSMISSION METHOD AND DETECTION DEVICE

(71) Applicant: Beijing Zhigu Rui Tuo Tech Co., Ltd, Beijing (CN)

(72) Inventor: Jia Liu, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 240 days.

(21) Appl. No.: 15/117,186

(22) PCT Filed: Jan. 15, 2015

(86) PCT No.: PCT/CN2015/070760
§ 371 (c)(1),
(2) Date: Aug. 6, 2016

(87) PCT Pub. No.: WO2015/139524
PCT Pub. Date: Sep. 24, 2015

(65) Prior Publication Data
US 2016/0380482 A1    Dec. 29, 2016

(30) Foreign Application Priority Data
Mar. 21, 2014   (CN) .......................... 2014 1 0109841

(51) Int. Cl.
*H02J 50/80*    (2016.01)
*H02J 50/40*    (2016.01)
(Continued)

(52) U.S. Cl.
CPC ............. *H02J 50/80* (2016.02); *H02J 50/00* (2016.02); *H02J 50/12* (2016.02); *H02J 50/40* (2016.02); *H02J 50/90* (2016.02); *H02J 7/025* (2013.01)

(58) Field of Classification Search
CPC .. H02J 50/80; H02J 50/90; H02J 50/00; H02J 50/12; H02J 50/40; H02J 7/025; H02J 17/00
See application file for complete search history.

(56) References Cited

U.S. PATENT DOCUMENTS 8,410,953 B2    4/2013    Zeine
8,558,661 B2   10/2013    Zeine
(Continued)

FOREIGN PATENT DOCUMENTS

CN    101711450 A    5/2010
CN    201594751 U    9/2010
(Continued)

OTHER PUBLICATIONS

Office Action dated Jan. 11, 2018 for U.S. Appl. No. 15/115,657, 27 pages.
(Continued)

*Primary Examiner* — Carlos D Amaya
(74) *Attorney, Agent, or Firm* — Amin, Turocy & Watson, LLP

(57) ABSTRACT

A wireless energy transmission method and a detection device are provided. A method includes detecting abnormality in changes of wireless energy transmission intensity in a phase calibration stage between a wireless energy sending device and a wireless energy receiving device; and notifying the wireless energy sending device of the abnormality in the case that the abnormality is detected. It can be detected that the wireless energy receiving device is affected by other non-associated wireless energy sending devices.

32 Claims, 6 Drawing Sheets

(51) Int. Cl.
  *H02J 50/00*   (2016.01)
  *H02J 50/90*   (2016.01)
  *H02J 50/12*   (2016.01)
  *H02J 7/02*   (2016.01)

(56) References Cited

U.S. PATENT DOCUMENTS

| | | |
|---|---|---|
| 9,407,327 B2 | 8/2016 | Kirby et al. |
| 2010/0033021 A1 | 2/2010 | Bennett |
| 2010/0148723 A1 | 6/2010 | Cook et al. |
| 2011/0115303 A1 | 5/2011 | Baarman et al. |
| 2013/0137455 A1 | 5/2013 | Xia et al. |
| 2013/0249481 A1 | 9/2013 | Jacobs et al. |

FOREIGN PATENT DOCUMENTS

| | | |
|---|---|---|
| CN | 102318214 A | 1/2012 |
| CN | 102714430 A | 10/2012 |
| CN | 103155353 A | 6/2013 |
| CN | 103795157 A | 5/2014 |
| CN | 103872796 A | 6/2014 |
| EP | 2654049 A2 | 10/2013 |
| JP | 2010-183812 A | 8/2010 |
| WO | 2013028111 A1 | 2/2013 |

OTHER PUBLICATIONS

International Search Report for PCT Application No. PCT/CN2015/070749, dated Apr. 13, 2015, 2 pages.
"COTA is here" published online at [http://www.ossiainc.com/how.html], archived version dated Mar. 6, 2014 retrieved from the Internet Archive Wayback Machine on Aug. 5, 2016, 2 pages.
International Search Report for PCT Application No. PCT/CN2015/070760, dated Apr. 17, 2015, 2 pages.
Office Action dated Aug. 9, 2018 for U.S. Appl. No. 15/115,657, 27 pages.

WIRELESS ENERGY TRANSMISSION METHOD AND DETECTION DEVICE

RELATED APPLICATION

The present application is a U.S. National Stage filing under 35 U.S.C. § 371 of international patent cooperation treaty (PCT) application No. PCT/CN2015/070760, filed Jan. 15, 2015, and entitled "WIRELESS ENERGY TRANSMISSION METHOD AND DETECTION DEVICE", which claims the benefit of priority to Chinese Patent Application No. 201410109841.6, filed on Mar. 21, 2014, which applications are hereby incorporated into the present application by reference herein in their respective entireties.

TECHNICAL FIELD

The present application relates to the field of wireless energy transmission, and in particular, to a wireless energy transmission method and a detection device.

BACKGROUND

In wireless charging/power supply technologies, energy sending devices and energy receiving devices perform energy transmission wirelessly. The existing wireless charging/power supply technologies include an inductive coupling technology, a magnetic resonance technology, a microwave energy transmission technology, and the like. The inductive coupling technology and the magnetic resonance technology are applicable to short-distance (magnitude of centimeter) wireless charging/power supply application scenarios, while it is likely that the microwave energy transmission technology achieves wireless energy transmission between energy sending devices and energy receiving devices in long-distance (the maximum distance is about 10 meters) application scenarios.

FIG. 1 illustrates a working principle of the microwave energy transmission technology; in a wireless energy transmission system of FIG. 1, a wireless energy sending device 330a includes a power source 300, a communication module 320, a control logic 310 and a microwave array 101a, and a wireless energy receiving device 330b includes a rectifier 340, a control logic 350, a communication module 360 and a battery 370. The wireless energy sending device 330a transmits energy 301 to the wireless energy receiving device 330b through a wireless microwave. The microwave array 101a in the wireless energy sending device 330a includes a plurality of emitter nodes with adjustable phases, for example, the number of the emitter nodes may be up to 20000, and the emitter nodes are configured to send the energy 301, and the rectifier 340 in the wireless energy receiving device 330b receives the energy 301, so as to supply power for the battery 370 in the wireless energy receiving device 330b. At the beginning of establishment of a wireless energy transmission relationship between the wireless energy sending device 330a and the wireless energy receiving device 330b or when relative positions between them change, the microwave array 101a in the wireless energy sending device 330a will adjust phases of the emitter nodes one by one, so that each emitter node is adjusted to the optimum phase for wireless energy transmission so as to achieve the best wireless energy transmission effect, and the above process is called a "phase calibration stage". In the phase calibration stage, the communication module 360 in the wireless energy receiving device 330b constantly sends a feedback signal to the communication module 320 in the wireless energy sending device 330a through a wireless data communication channel, so as to report wireless energy transmission intensity (or wireless energy transmission power) received by the rectifier 340 to the wireless energy sending device 330a, the control logic 310 in the wireless energy sending device 330a adjusts phases of emitter nodes in the microwave array 101a one by one, and the phase calibration stage ends until the wireless energy transmission intensity reported by the communication module 360 in the wireless energy receiving device 330b reaches the maximum. Reference may be made to U.S. Pat Nos. 8,558,661B2 and 8,410,953B2 and other documents for related information of the microwave energy transmission technology.

When a wireless energy sending device TxA is in the phase calibration stage to perform wireless energy transmission with a wireless energy receiving device Rx1 associated therewith, the wireless energy sending device TxA receives a feedback signal from the wireless energy receiving device Rx1 and adjusts phases of emitter nodes. As shown in FIG. 2, the wireless energy receiving device Rx1 may simultaneously appear in a wireless energy transmission range of another wireless energy sending device TxB (for example, the wireless energy sending device TxB, at this time, is establishing a wireless energy transmission relationship with another wireless energy receiving device Rx2) which is in the phase calibration stage, due to being affected by the wireless energy sending device TxB, the feedback signal reported by the wireless energy receiving device Rx1 to the wireless energy sending device TxA is interfered, resulting in that the emitter nodes of the wireless energy sending device TxA are not adjusted to optimum phases, which may seriously affect the wireless energy transmission effect on the wireless energy receiving device Rx1.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed descriptions of the various embodiments that follow in the disclosure.

An example objective of the present application is to provide a wireless energy transmission technology and a detection technology.

In one example aspect, the present application provides a wireless energy transmission method, and the method includes:

detecting abnormality in changes of wireless energy transmission intensity in a phase calibration stage between a wireless energy sending device and a wireless energy receiving device; and notifying the wireless energy sending device of the abnormality in the case that the abnormality is detected.

In another example aspect, the present application further provides a wireless energy transmission method, and the method includes:

receiving, from a wireless energy receiving device, wireless energy transmission intensity in a phase calibration stage between a wireless energy sending device and the wireless energy receiving device; and detecting abnormality in changes of the wireless energy transmission intensity.

In another example aspect, the present application further provides a detection device, and the device includes:
- a detection module, configured to detect abnormality in changes of wireless energy transmission intensity in a phase calibration stage between a wireless energy sending device and a wireless energy receiving device; and
- a notification module, configured to notify the wireless energy sending device of the abnormality in the case that the abnormality is detected.

In another example aspect, the present application further provides a detection device, and the device includes:
- a receiving module, configured to receive, from a wireless energy receiving device, wireless energy transmission intensity in a phase calibration stage between a wireless energy sending device and the wireless energy receiving device; and
- a detection module, configured to detect abnormality in changes of the wireless energy transmission intensity.

A method and a device in at least one embodiment of the present application can detect that the wireless energy receiving device is affected by other non-associated wireless energy sending devices.

DETAILED DESCRIPTION

Figure 1:
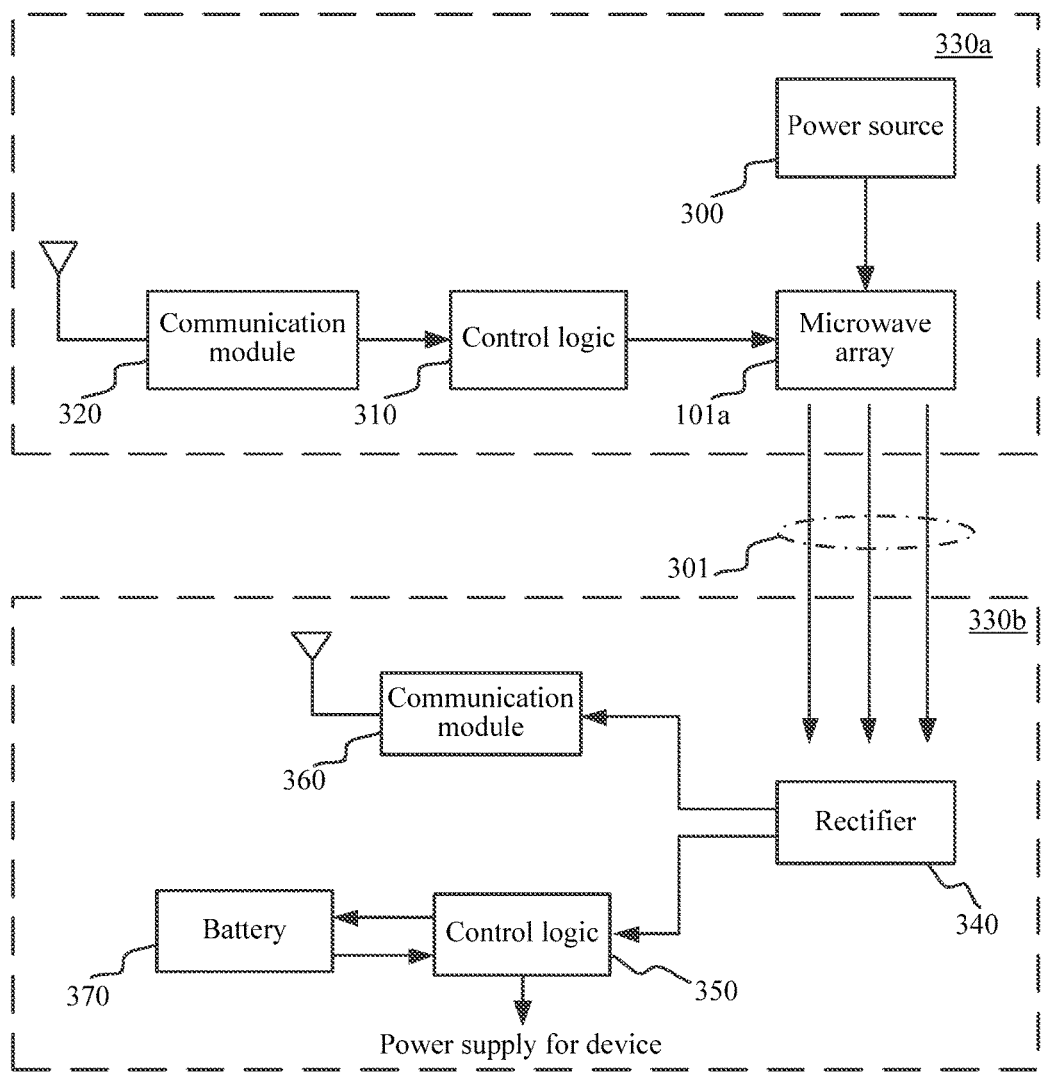
FIG. 1 is an example working principle diagram of a microwave energy transmission technology.

Embodiments of the present application are described in detail hereinafter with reference to the accompanying drawings (the same reference numerals in several drawings indicate the same elements) and embodiments. The following embodiments are intended to describe the present application, but not to limit the scope of the present application.

Those skilled in the art should understand that, the terms such as "first" and "second" in the present application are merely used to distinguish different steps, devices or modules, which neither represent any specific technical meaning nor represent a necessary logical order between them.

In each embodiment of the present application, "wireless energy transmission intensity" is used to indicate energy obtained by a wireless energy receiving device per unit time, and those skilled in the art can determine the wireless energy transmission intensity by monitoring a charging current, a charging voltage, a charging power, a rate of change in power or the like of the wireless energy receiving device.

Figure 3:
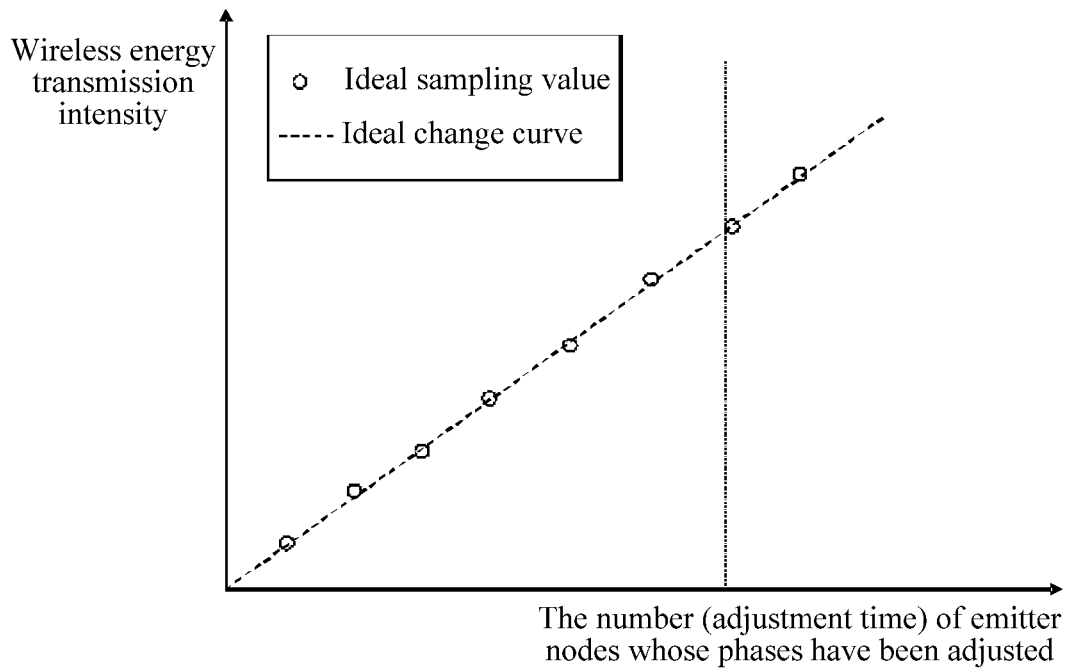
FIG. 3 is an example diagram of a change curve of wireless energy transmission intensity in a phase calibration stage in an ideal state.

The applicant's research shows that, in the absence of interference by other non-associated devices, with one-by-one phase adjustment on emitter nodes of a wireless energy sending device in a phase calibration stage, changes of wireless energy transmission intensity between the wireless energy sending device and a wireless energy receiving device should be stable. FIG. 3 illustrates a change curve of wireless energy transmission intensity in a phase calibration stage in an ideal state, and the change curve reflects a change trend of the wireless energy transmission intensity. In FIG. 3, the horizontal axis represents the number of emitter nodes on which the wireless energy sending device has completed phase adjustment in the phase calibration stage (which may correspondingly represent adjustment time of the phase calibration stage), the vertical axis represents the value of the wireless energy transmission intensity, a plurality of dots in FIG. 3 show wireless energy transmission intensity values sampled after completion of phase adjustment on each emitter node, a change curve shown by dotted lines is formed by connections of a plurality of straight lines connected to adjacent sampling points, and because changes of the wireless energy transmission intensity are stable, the change curve basically forms a straight line. It can be known according to the change curve of the wireless energy transmission intensity in FIG. 3 that, with one-by-one phase adjustment on a plurality of emitter nodes in the wireless energy sending device, the wireless energy transmission intensity received by the wireless energy receiving device may increase linearly in proportion to the number of the emitter nodes whose phases have been adjusted.

Based on the above research results, it is possible to detect abnormality in changes of wireless energy transmission intensity in a phase calibration stage between a wireless energy sending device and a wireless energy receiving device, so as to detect effects of other non-associated wireless energy receiving device on the wireless energy receiving device.

Figure 4:
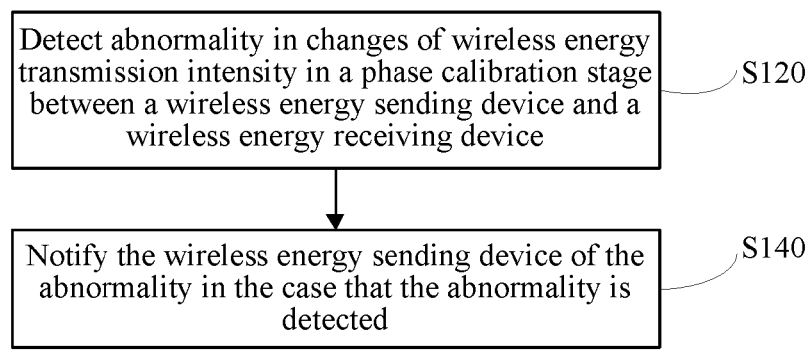
FIG. 4 is an example flowchart of a wireless energy transmission method according to an example embodiment of the present application.

As shown in FIG. 4, an example embodiment of the present application provides a wireless energy transmission method, and the method may be implemented in a wireless energy receiving device or implemented in another device independent of a wireless energy receiving device or a wireless energy sending device. The method includes:

S120: detecting abnormality in changes of wireless energy transmission intensity in a phase calibration stage between a wireless energy sending device and a wireless energy receiving device; and S140: notifying the wireless energy sending device of the abnormality in the case that the abnormality is detected.

Functions of the steps in the wireless energy transmission method are described below with reference to FIG. 4.

S120: Detect abnormality in changes of wireless energy transmission intensity in a phase calibration stage between a wireless energy sending device and a wireless energy receiving device.

It can be known according to the change curve of the wireless energy transmission intensity shown in FIG. 3 that, in the absence of interference by other non-associated wireless energy sending devices, a wireless energy transmission intensity change trend between the wireless energy sending device and a wireless energy receiving device in the phase calibration stage should be stable. Therefore, in an example embodiment, the abnormality may be detected based on the change trend of the changes of the wireless energy transmission intensity.

Figure 2:
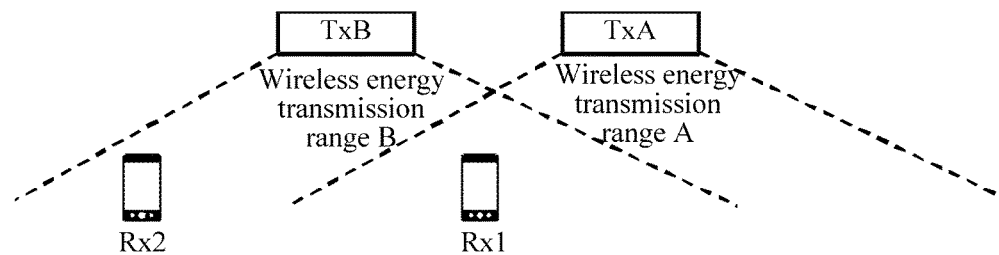
FIG. 2 is an example schematic diagram of a scenario where a wireless energy receiving device is affected by other non-associated wireless energy sending devices.
Figure 5:
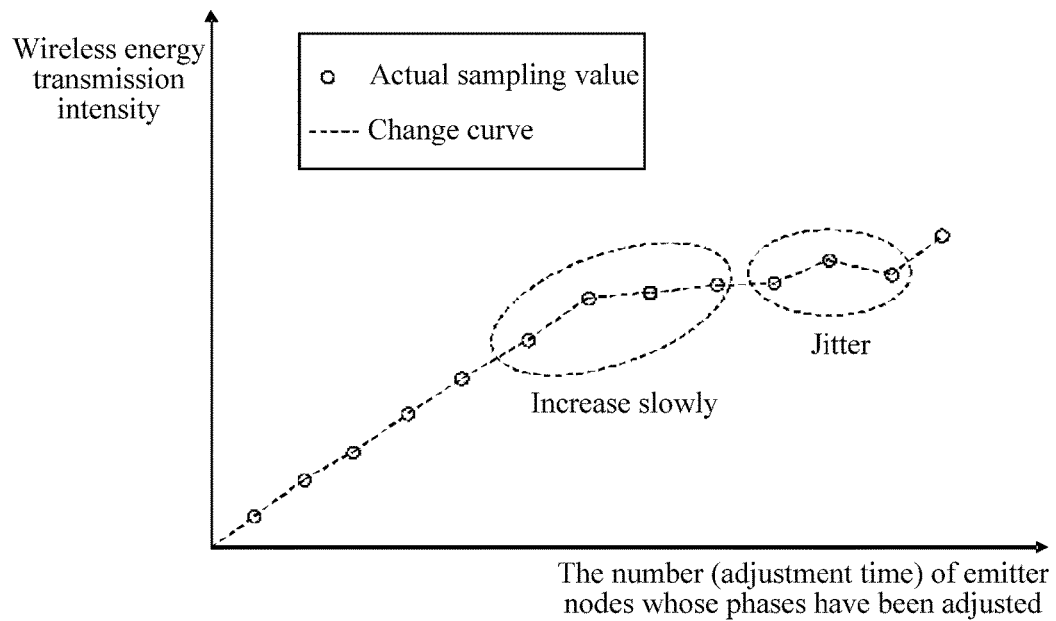
FIG. 5 is an example diagram of a change curve of wireless energy transmission intensity in a phase calibration stage in an interfered state.

As shown in FIG. 2, when a wireless energy receiving device Rx1 simultaneously appears in a wireless energy transmission range of another wireless energy sending device TxB that is in the phase calibration stage, due to being affected by the non-associated wireless energy sending device TxB, emitter nodes of the wireless energy sending device TxA may not be adjusted to the optimum phases, which may result in significant change of the change trend of the changes of the wireless energy transmission intensity. FIG. 5 illustrates a possible change curve of the wireless energy transmission intensity in the phase calibration stage in the presence of such interference, and a plurality of sampling points on the change curve records wireless energy transmission intensity values received by the wireless energy receiving device after completion of phase adjustment on each emitter node in the wireless energy sending device. In the change curve shown in FIG. 5, a situation where the wireless energy transmission intensity shown in the left dotted ellipse increases slowly may occur, and a situation where the wireless energy transmission intensity change trend shown in the right dotted ellipse jitters may also occur. Compared with the linear curve whose slope is unchanged when the wireless energy transmission intensity changes stably in FIG. 3, in the plurality of straight lines formed by connections of adjacent sampling points in FIG. 5, slopes are substantially identical when the wireless energy transmission intensity changes stably, while the slopes may change significantly when the intensity increases slowly or the intensity change trend jitters.

Therefore, slope changes of the straight lines connected to the adjacent sampling points in the change curve may be detected, and it is judged that abnormality in the changes of the wireless energy transmission intensity is detected when the slopes change significantly. As an example embodiment of judging whether slope changes of the straight lines are significant, those skilled in the art may set a first threshold according to actual demands, and judge that the slopes of the straight lines change significantly in the case that an absolute value of a difference between slopes of two adjacent straight lines in the change curve exceeds the first threshold, that is, judge that abnormality in the changes of the wireless energy transmission intensity is detected.

In another example embodiment, the abnormality may be detected based on a position of the wireless energy receiving device and an ideal wireless energy transmission intensity change trend corresponding to the position.

Figure 6:
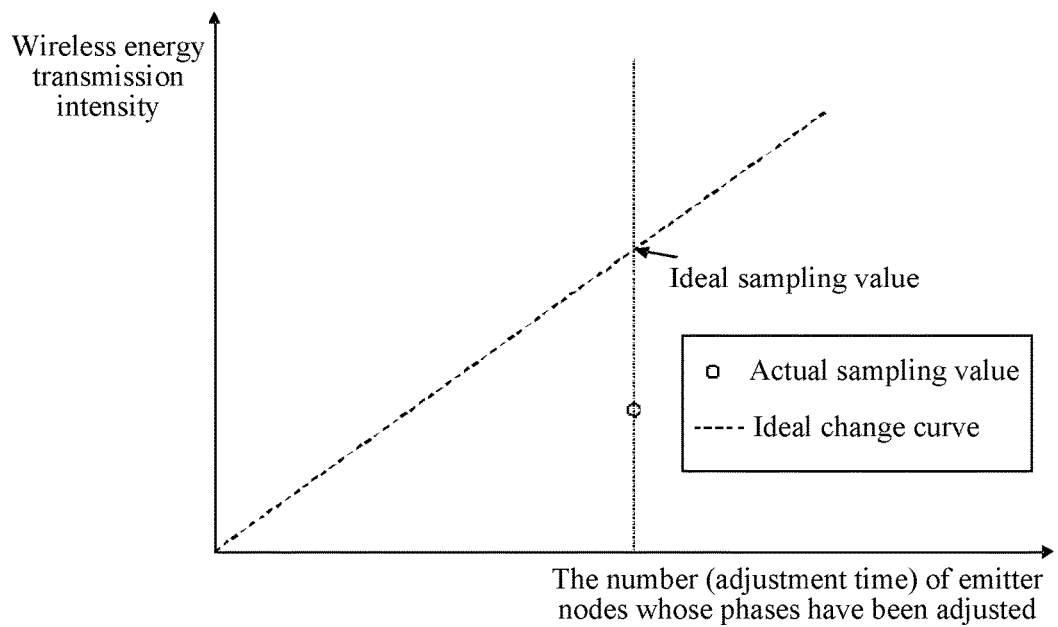
FIG. 6 is an example comparison diagram of an actual wireless energy transmission intensity value and an ideal wireless energy transmission intensity change curve.

Those skilled in the art may understand that, according to different relative position relationships between a wireless energy sending device and a wireless energy receiving device, the wireless energy transmission intensity change trend varies in a phase calibration stage, which is relevant to a distance, a medium and the like between the wireless energy sending device and the wireless energy receiving device. Therefore, in the case that the position of the wireless energy sending device is fixed, each position of the wireless energy receiving device in a wireless energy transmission range of the wireless energy sending device corresponds to a wireless energy transmission intensity change trend, that is, corresponds to a wireless energy transmission intensity change curve in an ideal state; as shown in FIG. 6 (ideal sampling points on the curve are not shown), a plurality of ideal sampling points on the ideal wireless energy transmission intensity change curve records wireless energy transmission intensity values received by the wireless energy receiving device after completion of phase adjustment on each emitter node in the wireless energy sending device.

Therefore, at any time, as long as the number of emitter nodes (or corresponding adjustment time) on which the wireless energy sending device has completed phase adjustment is determined, the abnormality in the changes of the wireless energy transmission intensity may be detected based on a position of the wireless energy receiving device and an ideal wireless energy transmission intensity change curve corresponding to the position. As shown in FIG. 6, an actual wireless energy transmission intensity value received by the wireless energy receiving device at a certain time is an actual sampling value shown by dots, there may be a certain gap between the actual sampling value and a corresponding ideal sampling value on the wireless energy transmission intensity change curve at this time, and a value of the gap may be used as a standard for judging whether abnormality in changes of wireless energy transmission intensity occurs. Specifically, those skilled in the art may set a second threshold according to actual demands, and judge that the abnormality in the changes of the wireless energy transmission intensity is detected in the case that an absolute value of a difference between an actual wireless energy transmission intensity value and a corresponding value in the ideal wireless energy transmission intensity change curve exceeds the second threshold.

In the example embodiment, it is unnecessary to detect and record each wireless energy transmission intensity sampling value in the phase calibration stage, and it is merely necessary to query a corresponding ideal wireless energy transmission intensity change curve according to the number (or adjustment time) of emitter nodes on which phase adjustment has been completed at the moment and the position of the wireless energy receiving device. Those skilled in the art may understand that, the number (or the corresponding adjustment time) of emitter nodes on which the wireless energy sending device has completed phase adjustment may be acquired from the wireless energy sending device; the ideal wireless energy transmission intensity change curve corresponding to each position may be obtained through a previous test and stored in a corresponding device that implements the method in this embodiment. In this case, in order to acquire the position of the wireless energy receiving device, the method in this embodiment may further include step S110: detecting the position of the wireless energy receiving device.

S140: Notify the wireless energy sending device of the abnormality in the case that the abnormality is detected.

In the case that the abnormality in the changes of the wireless energy transmission intensity is detected, it indicates that the wireless energy receiving device is interfered by other non-associated wireless energy sending devices. In order to further eliminate such interference, the wireless energy receiving device or another device that performs the method in this embodiment may send the detected abnormality information to the wireless energy sending device associated therewith, so that the wireless energy sending device performs various possible adjustments including self-adaptive adjustment, thereby eliminating such interference.

In an example embodiment, in addition to sending the abnormality information to the associated wireless energy sending device, the abnormality information may also be sent to at least one wireless energy sending device including the wireless energy sending device causing interference. Specifically, the associated wireless energy sending device and other wireless energy sending devices including the wireless energy sending device causing interference may be notified of the abnormality information through broadcasting at the same time, and thus the abnormality information may become a reference signal, and a plurality of wireless energy sending devices receiving the reference signal may achieve precise asynchronous scheduling based on the reference signal, so that different wireless energy sending devices can perform asynchronous operation, thereby eliminating the interference. The "asynchronous operation" means different wireless energy sending devices, while executing phase adjustment on the emitter nodes, are mutually staggered in a time domain or frequency domain so as to avoid mutual interference.

In view of the above, the wireless energy transmission method in the embodiment can detect that the wireless energy receiving device is affected by other non-associated wireless energy sending devices and notify the associated wireless energy sending device of the effect, so as to provide the possibility of further eliminating the effect.

Figure 7:
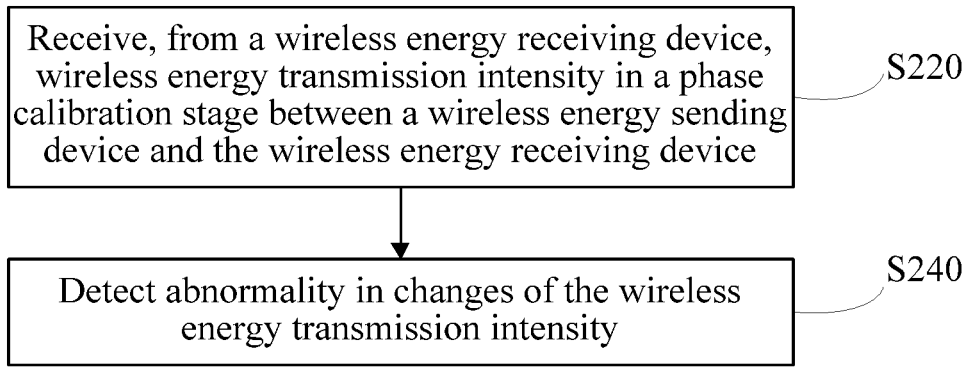
FIG. 7 is an example flowchart of another wireless energy transmission method according to an example embodiment of the present application.

As shown in FIG. 7, another specific embodiment of the present application provides a wireless energy transmission method, and the method may be implemented in a wireless energy sending device or implemented in another device independent of a wireless energy receiving device or a wireless energy sending device. The method includes:

S220: receiving, from a wireless energy receiving device, wireless energy transmission intensity in a phase calibration stage between a wireless energy sending device and the wireless energy receiving device; and S240: detecting abnormality in changes of the wireless energy transmission intensity.

Functions of the steps in the wireless energy transmission method are described below with reference to FIG. 7.

S220: Receive, from a wireless energy receiving device, wireless energy transmission intensity in a phase calibration stage between a wireless energy sending device and the wireless energy receiving device.

A wireless energy sending device associated with a wireless energy receiving device or a device that implements the method in this embodiment may receive feedback information from the wireless energy receiving device, thereby acquiring wireless energy transmission intensity received by the wireless energy receiving device in a phase calibration stage. The receiving operation may merely acquire one or more wireless energy transmission intensity values in the phase calibration stage, and may also be continued in the phase calibration stage, so as to obtain wireless energy transmission intensity values corresponding to emitter nodes of the wireless energy sending device after completion of phase adjustment.

S240: Detect abnormality in changes of the wireless energy transmission intensity.

It can be known according to the change curve of the wireless energy transmission intensity shown in FIG. 3 that, in the absence of interference by other non-associated wireless energy sending devices, a wireless energy transmission intensity change trend between the wireless energy sending device and a wireless energy receiving device in the phase calibration stage should be stable. Therefore, in an example embodiment, the abnormality may be detected based on the change trend of the changes of the wireless energy transmission intensity.

FIG. 5 illustrates a possible change curve of the wireless energy transmission intensity in the phase calibration stage in the presence of interference, and a plurality of sampling points on the change curve records wireless energy transmission intensity values received by the wireless energy receiving device after completion of phase adjustment on each emitter node in the wireless energy sending device. Therefore, slope changes of the straight lines connected to the adjacent sampling points in the change curve in FIG. 5 may be detected, and it is judged that abnormality in the changes of the wireless energy transmission intensity is detected when the slopes change significantly. As an example embodiment of judging whether slope changes of the straight lines are significant, those skilled in the art may set a first threshold according to actual demands, and judge that the slopes of the straight lines change significantly in the case that an absolute value of a difference between slopes of two adjacent straight lines in the change curve exceeds the first threshold, that is, judge that abnormality in the changes of the wireless energy transmission intensity is detected.

In another example embodiment, the abnormality may be detected based on a position of the wireless energy receiving device and an ideal wireless energy transmission intensity change trend corresponding to the position.

In the case that the position of the wireless energy sending device is fixed, each position of the wireless energy receiving device in a wireless energy transmission range of the wireless energy sending device corresponds to a wireless energy transmission intensity change trend, that is, corresponds to a wireless energy transmission intensity change curve in an ideal state; as shown in FIG. 6 (ideal sampling points on the curve are not shown), a plurality of ideal sampling points on the ideal wireless energy transmission intensity change curve records wireless energy transmission intensity values received by the wireless energy receiving device after completion of phase adjustment on each emitter node in the wireless energy sending device.

Therefore, at any time, as long as the number of emitter nodes (or corresponding adjustment time) on which the wireless energy sending device has completed phase adjustment is determined, the abnormality in the changes of the wireless energy transmission intensity may be detected based on a position of the wireless energy receiving device and an ideal wireless energy transmission intensity change curve corresponding to the position. As shown in FIG. 6, an actual wireless energy transmission intensity value received by the wireless energy receiving device at a certain time is an actual sampling value shown by dots, there may be a certain gap between the actual sampling value and a corresponding ideal sampling value on the wireless energy transmission intensity change curve at this time, and a value of the gap may be used as a standard for judging whether abnormality in changes of wireless energy transmission intensity occurs. Specifically, those skilled in the art may set a second threshold according to actual demands, and judge that the abnormality in the changes of the wireless energy transmission intensity is detected in the case that an absolute value of a difference between an actual wireless energy transmission intensity value and a corresponding value in the ideal wireless energy transmission intensity change curve exceeds the second threshold.

In the example embodiment, it is unnecessary to detect and record each wireless energy transmission intensity sampling value in the phase calibration stage, and it is merely necessary to query a corresponding ideal wireless energy transmission intensity change curve according to the number (or adjustment time) of emitter nodes on which phase adjustment has been completed at the moment and the position of the wireless energy receiving device. Those skilled in the art may understand that, the number (or the corresponding adjustment time) of emitter nodes on which the wireless energy sending device has completed phase adjustment may be acquired from the wireless energy sending device; the ideal wireless energy transmission intensity change curve corresponding to each position may be obtained through a previous test and stored in a corresponding device that implements the method in this embodiment. In this case, in order to acquire the position of the wireless energy receiving device, the method in this embodiment may further include step S230: receiving position information of the wireless energy receiving device, where the position information may come from the wireless energy receiving device and may also come from other devices having the position information.

In the case that the abnormality in the changes of the wireless energy transmission intensity is detected, it indicates that the wireless energy receiving device is interfered by other non-associated wireless energy sending devices. In order to make it possible to further eliminate such interference, in one example embodiment of this embodiment, the method may further include step S260: making the wireless energy sending device operate asynchronously with other wireless energy sending devices.

In an example embodiment of S260, the wireless energy sending device associated with the wireless energy receiving device may perform adaptive asynchronous scheduling according to operating states of other wireless energy sending devices, so that phase adjustment of its emitter nodes staggered from those of the other wireless energy sending devices in a time domain or frequency domain. In another example embodiment of S260, the wireless energy sending device associated with the wireless energy receiving device may negotiate with other wireless energy sending devices, for example, based on an asynchronous reference signal, so as to achieve precise asynchronous scheduling between them, so that different wireless energy sending devices operate asynchronously in the time domain or frequency domain, thereby eliminating the interference. Those skilled in the art may select a method for adjusting a time domain or frequency domain in the prior art according to actual demands, so as to achieve the above asynchronous scheduling.

In view of the above, the wireless energy transmission method in the embodiment can detect that the wireless energy receiving device is affected by other non-associated wireless energy sending devices and may realize asynchronous operation between wireless energy sending devices, so as to provide the possibility of further eliminating the effect.

Those skilled in the art should understand that, in the methods of the implementations of the present application, sequence numbers of the steps do not mean an order of execution, the order of execution of the steps should be determined according to functions and internal logic thereof, but should not pose any limitation to implementation of the specific embodiments of the present application.

In addition, an embodiment of the present application further provides a computer-readable medium, including a computer-readable instruction performing the following operations when being executed: executing the operations of steps S120 and S140 of the method in the embodiment shown in FIG. 4 or executing the operations of steps S220 and S240 of the method in the embodiment shown in FIG. 7.

Figure 8:
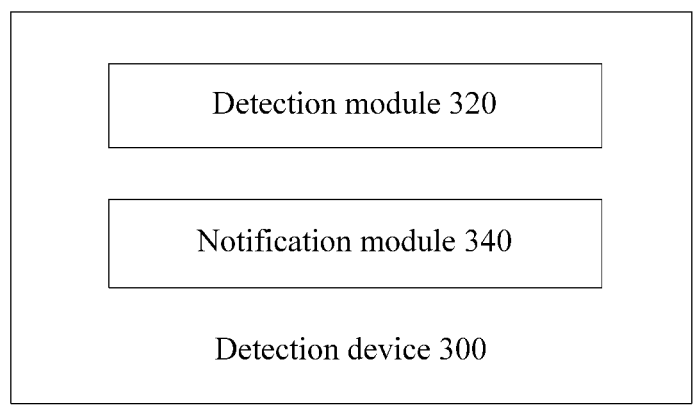
FIG. 8 is one example functional block diagram of a detection device according to an example embodiment of the present application.

As shown in FIG. 8, a specific embodiment of the present application provides a detection device 300, and the device may be implemented as a wireless energy receiving device or implemented as another device instead of a wireless energy receiving device or a wireless energy sending device. The detection device 300 includes:

a detection module 320, configured to detect abnormality in changes of wireless energy transmission intensity in a phase calibration stage between a wireless energy sending device and a wireless energy receiving device; and a notification module 340, configured to notify the wireless energy sending device of the abnormality in the case that the abnormality is detected.

Functions of the modules in the device are described below with reference to FIG. 8.

The detection module 320 is configured to detect abnormality in changes of wireless energy transmission intensity in a phase calibration stage between a wireless energy sending device and a wireless energy receiving device.

In an example embodiment, the detection module 320 may detect the abnormality based on the change trend of the changes of the wireless energy transmission intensity.

Compared with the linear curve whose slope is unchanged when the wireless energy transmission intensity changes stably in FIG. 3, in the plurality of straight lines formed by connections of adjacent sampling points in FIG. 5, slopes are substantially identical when the wireless energy transmission intensity changes stably, while the slopes may change significantly when the intensity increases slowly or the intensity change trend jitters. Therefore, the detection module 320 may detect slope changes of the straight lines connected to the adjacent sampling points in the change curve, and judges that abnormality in the changes of the wireless energy transmission intensity is detected when the slopes change significantly. As an example embodiment of judging whether slope changes of the straight lines are significant, those skilled in the art may set a first threshold according to actual demands, and the detection module 320 judges that the slopes of the straight lines change significantly in the case that an absolute value of a difference between slopes of two adjacent straight lines in the change curve exceeds the first threshold, that is, judges that abnormality in the changes of the wireless energy transmission intensity is detected.

In another example embodiment, the detection module 320 may detect the abnormality based on a position of the wireless energy receiving device and an ideal energy transmission intensity change trend corresponding to the position.

At any time, as long as the number of emitter nodes (or corresponding adjustment time) on which the wireless energy sending device has completed phase adjustment is determined, the detection module 320 may detect the abnormality in the changes of the wireless energy transmission intensity based on a position of the wireless energy receiving device and an ideal wireless energy transmission intensity change curve corresponding to the position. As shown in FIG. 6, an actual wireless energy transmission intensity value received by the wireless energy receiving device at a certain time is an actual sampling value shown by dots, there may be a certain gap between the actual sampling value and a corresponding ideal sampling value on the wireless energy transmission intensity change curve at this time, and a value of the gap may be used as a standard for judging whether abnormality in changes of wireless energy transmission intensity occurs. Specifically, those skilled in the art may set a second threshold according to actual demands, and the detection module 320 may judge that the abnormality in the changes of the wireless energy transmission intensity is detected in the case that an absolute value of a difference between an actual wireless energy transmission intensity value and a corresponding value in the ideal wireless energy transmission intensity change curve exceeds the second threshold.

Figure 9:
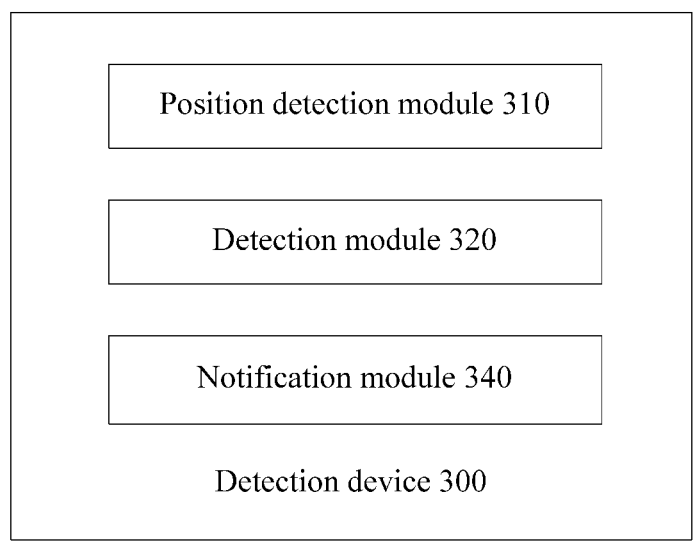
FIG. 9 is another example functional block diagram of a detection device according to an example embodiment of the present application.

In the example embodiment, it is unnecessary to detect and record each wireless energy transmission intensity sampling value in the phase calibration stage, and the detection module 320 merely needs to query a corresponding ideal wireless energy transmission intensity change curve according to the number (or adjustment time) of emitter nodes on which phase adjustment has been completed at the moment and the position of the wireless energy receiving device. Meanwhile, in order to acquire the position of the wireless energy receiving device, as shown in FIG. 9, the device 300 in this embodiment may further include a position detection module 310, configured to detect the position of the wireless energy receiving device.

The notification module 340 is configured to notify the wireless energy sending device of the abnormality in the case that the abnormality is detected.

In the case that the abnormality in the changes of the wireless energy transmission intensity is detected, it indicates that the wireless energy receiving device is interfered by other non-associated wireless energy sending devices. In order to further eliminate such interference, the notification module 340 may send the detected abnormality information to the wireless energy sending device associated with the wireless energy receiving device, so that the wireless energy sending device makes various possible adjustments including self-adaptive adjustment, thereby eliminating such interference.

In an example embodiment, in addition to sending the abnormality information to the associated wireless energy sending device, the notification module 340 may also send the abnormality information to at least one wireless energy sending device including the wireless energy sending device causing interference. Specifically, the notification module 340 may notify the associated wireless energy sending device and other wireless energy sending devices including the wireless energy sending device causing interference of the abnormality information through broadcasting at the same time, and thus the abnormality information may become a reference signal, and a plurality of wireless energy sending devices receiving the reference signal may achieve precise asynchronous scheduling based on the reference signal, so that different wireless energy sending devices operate asynchronously, thereby eliminating the interference.

In view of the above, the device in the embodiment can detect that the wireless energy receiving device is affected by other non-associated wireless energy sending devices and notify the associated wireless energy sending device of the effect, so as to provide the possibility of further eliminating the effect.

Figure 10:
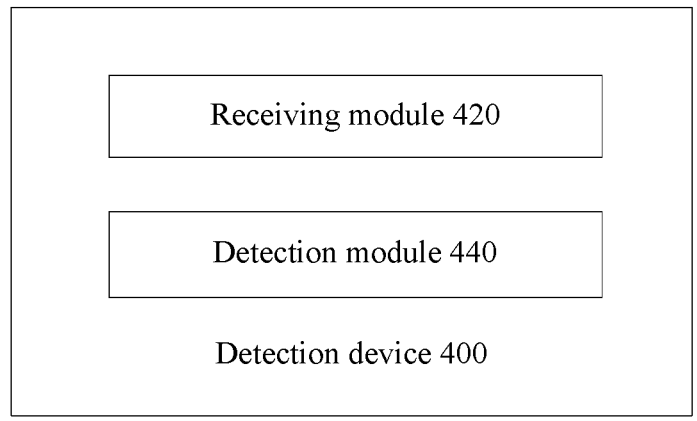
FIG. 10 is one example functional block diagram of another detection device according to an example embodiment of the present application.

As shown in FIG. 10, another specific embodiment of the present application provides a detection device 400, and the device may be implemented as a wireless energy sending device or implemented as another device instead of a wireless energy receiving device or a wireless energy sending device. The detection device 400 includes:
a receiving module 420, configured to receive, from a wireless energy receiving device, wireless energy transmission intensity in a phase calibration stage between a wireless energy sending device and the wireless energy receiving device; and a detection module 440, configured to detect abnormality in changes of the wireless energy transmission intensity.

Functions of the modules in the device are described below with reference to FIG. 10.

The receiving module 420 is configured to receive, from a wireless energy receiving device, wireless energy transmission intensity in a phase calibration stage between a wireless energy sending device and the wireless energy receiving device.

The receiving module 420 may receive feedback information from the wireless energy receiving device, thereby acquiring wireless energy transmission intensity received by the wireless energy receiving device in a phase calibration stage. The receiving module 420 may merely acquire one or more wireless energy transmission intensity values in the phase calibration stage, and may continue the operation in the phase calibration stage, so as to obtain wireless energy transmission intensity values corresponding to emitter nodes of the wireless energy sending device after completion of phase adjustment.

The detection module 440 is configured to detect abnormality in changes of the wireless energy transmission intensity.

In an example embodiment, the detection module 440 may detect the abnormality based on the change trend of the changes of the wireless energy transmission intensity.

The detection module 440 may detect slope changes of the straight lines connected to the adjacent sampling points in the change curve in FIG. 5, and judge that abnormality in the changes of the wireless energy transmission intensity is detected when the slopes change significantly. As an example embodiment of judging whether slope changes of the straight lines are significant, those skilled in the art may set a first threshold according to actual demands, and the detection module 440 judges that the slopes of the straight lines change significantly in the case that an absolute value of a difference between slopes of two adjacent straight lines in the change curve exceeds the first threshold, that is, judges that abnormality in the changes of the wireless energy transmission intensity is detected.

In another example embodiment, the detection module 440 may detect the abnormality based on a position of the wireless energy receiving device and an ideal wireless energy transmission intensity change trend corresponding to the position.

At any time, as long as the number of emitter nodes (or corresponding adjustment time) on which the wireless energy sending device has completed phase adjustment is determined, the detection module 440 may detect the abnormality in the changes of the wireless energy transmission intensity based on a position of the wireless energy receiving device and an ideal wireless energy transmission intensity change curve corresponding to the position. As shown in FIG. 6, an actual wireless energy transmission intensity value received by the wireless energy receiving device at a certain time is an actual sampling value shown by dots, there may be a certain gap between the actual sampling value and a corresponding ideal sampling value on the wireless energy transmission intensity change curve at this time, and a value of the gap may be used as a standard for judging whether abnormality in changes of wireless energy transmission intensity occurs. Specifically, those skilled in the art may set a second threshold according to actual demands, and the detection module 440 may judge that the abnormality in the changes of the wireless energy transmission intensity is detected in the case that an absolute value of a difference between an actual wireless energy transmission intensity value and a corresponding value in the ideal wireless energy transmission intensity change curve exceeds the second threshold.

In the example embodiment, it is unnecessary to detect and record each wireless energy transmission intensity sampling value in the phase calibration stage, and the detection module 440 merely needs to query a corresponding ideal wireless energy transmission intensity change curve according to the number (or adjustment time) of emitter nodes on which phase adjustment has been completed at the moment and the position of the wireless energy receiving device. Meanwhile, in order to acquire the position of the wireless energy receiving device, the receiving module 420 of the device in this embodiment may be further configured to receive position information of the wireless energy receiving device, where the position information may be from the wireless energy receiving device and may also be from other devices having the position information.

Figure 11:
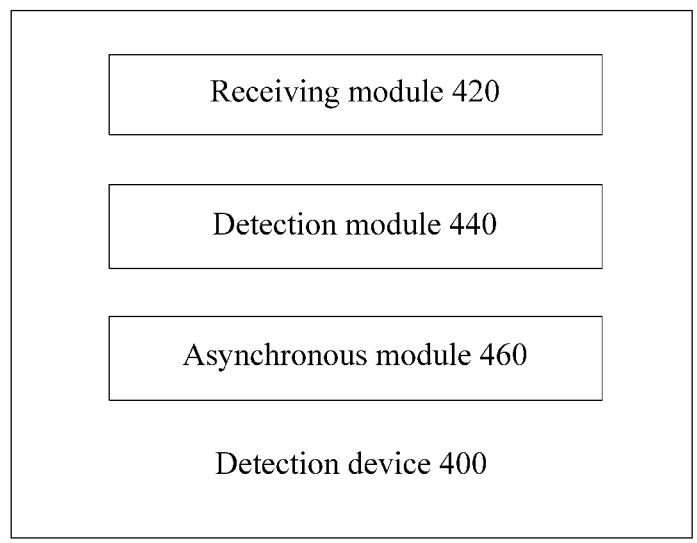
FIG. 11 is another example functional block diagram of another detection device according to an example embodiment of the present application.

In the case that the abnormality in the changes of the wireless energy transmission intensity is detected, it indicates that the wireless energy receiving device is interfered by other non-associated wireless energy sending devices. In order to make it possible to further eliminate such interference, in an example embodiment of this embodiment, as shown in FIG. 11, the detection device 400 may further include an asynchronous module 460, configured to make the wireless energy sending device operate asynchronously with other wireless energy sending devices.

In view of the above, the device in the embodiment can detect that the wireless energy receiving device is affected by other non-associated wireless energy sending devices and may realize asynchronous operation between wireless energy sending devices, so as to provide the possibility of further eliminating the effect.

Figure 12:
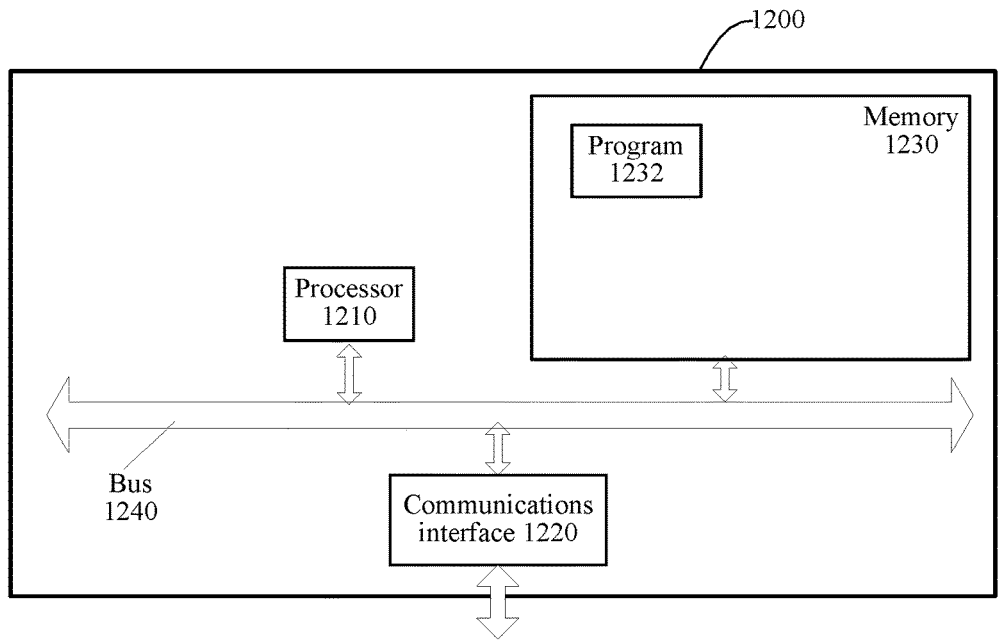
FIG. 12 is an example hardware structure diagram of a detection device according to an example embodiment of the present application.

FIG. 12 is a schematic structural diagram of a detection device 1200 according to an embodiment of the present application, and the specific embodiment of the present application does not limit specific implementation of the detection device 1200. As shown in FIG. 12, the detection device 1200 may include:

a processor 1210, a communications interface 1220, a memory 1230, and a communications bus 1240.

The processor 1210, the communications interface 1220, and the memory 1230 complete mutual communications via the communications bus 1240.

The communications interface 1220 is configured to communicate with a network element such as a client.

The processor 1210 is configured to execute a program 1232, and specifically, may implement relevant functions in the device embodiments shown in FIG. 8 to FIG. 9.

Specifically, the program 1232 may include a program code, the program code including a computer operation instruction.

The processor 1210 may be a central processing unit (CPU), or an application specific integrated circuit (ASIC), or be configured to be one or more integrated circuits that implement the embodiments of the present application.

The memory 1230 is configured to store the program 1232. The memory 1230 may include a high-speed RAM memory, and may also include a non-volatile memory, for example, at least one magnetic disk memory. The program 1232 may specifically implement the following operations:
   detecting abnormality in changes of wireless energy transmission intensity in a phase calibration stage between a wireless energy sending device and a wireless energy receiving device; and
   notifying the wireless energy sending device of the abnormality in the case that the abnormality is detected.

Reference may be made to the corresponding steps or modules in the embodiments for specific implementation of each unit in the program 1232, which is not repeated herein.

Figure 13:
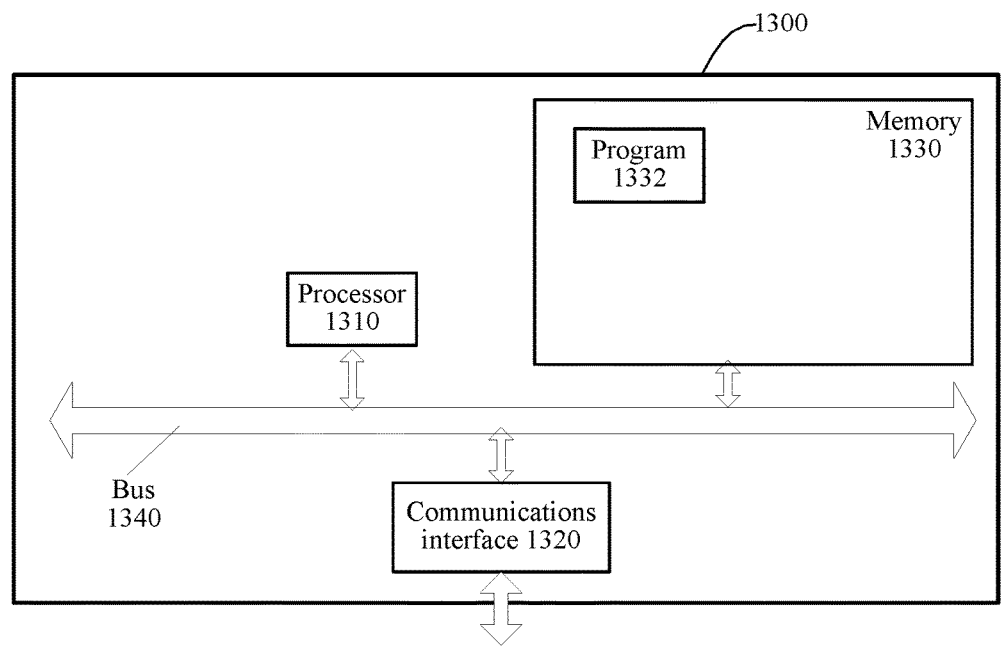
FIG. 13 is an example hardware structure diagram of another detection device according to an example embodiment of the present application.

FIG. 13 is a schematic structural diagram of a detection device 1300 according to an embodiment of the present application, and the specific embodiment of the present application does not limit specific implementation of the detection device 1300. As shown in FIG. 13, the detection device 1300 may include:

a processor 1310, a communications interface 1320, a memory 1330, and a communications bus 1340.

The processor 1310, the communications interface 1320, and the memory 1330 complete mutual communications via the communications bus 1340.

The communications interface 1320 is configured to communicate with a network element such as a client.

The processor 1310 is configured to execute a program 1332, and specifically, may implement relevant functions in the device embodiments shown in FIG. 10 to FIG. 11.

Specifically, the program 1332 may include a program code, the program code including a computer operation instruction.

The processor 1310 may be a central processing unit (CPU), or an application specific integrated circuit (ASIC), or be configured to be one or more integrated circuits which implement the embodiments of the present application.

The memory 1330 is configured to store the program 1332. The memory 1330 may include a high-speed RAM memory, and may also include a non-volatile memory, for example, at least one magnetic disk memory. The program 1332 may specifically implement the following operations:
   receiving, from a wireless energy receiving device, wireless energy transmission intensity in a phase calibration stage between a wireless energy sending device and the wireless energy receiving device; and
   detecting abnormality in changes of the wireless energy transmission intensity.

Reference may be made to the corresponding steps or modules in the embodiments for specific realization of each unit in the program 1332, which is not repeated herein.

Those skilled in the art may clearly understand that, reference may be made to the corresponding description in the foregoing apparatus embodiments for the specific working procedures of the devices and the modules described above, and will not be repeated herein in order to make the description convenient and concise.

Although the subject matter described herein is provided in a general context executed in combination with execution of an operating system and applications on a computer system, those skilled in the art may realize that other implementations may also be executed in combination with other types of program modules. Generally, the program modules include routines, programs, components, data structures and other types of structures executing particular tasks or implement particular abstract data types. Those skilled in the art may understand that, the subject matter described herein may be practiced with other computer system configurations, including handheld devices, multiprocessor systems, microprocessor-based or programmable consumer electronic products, minicomputers, mainframe computers, etc., and may also be used in a distributed computing environment in which tasks are executed by remote processing devices connected via a communication network. In the distributed computing environment, the program modules may be located in both local and remote memory storage devices.

It may be appreciated by those of ordinary skill in the art that each exemplary unit and method step described with reference to the embodiments disclosed herein may be implemented by electronic hardware or a combination of computer software and electronic hardware. Whether these functions are executed in a hardware mode or a software mode depends on particular applications and design constraint conditions of the technical solution. The professional technicians may use different methods to implement the functions described with respect to each particular application, but such implementation should not be considered to go beyond the scope of the present application.

If the functions are implemented in the form of a software functional unit and is sold or used as an independent product, it may be stored in a computer-readable storage medium. Based on such understanding, the technical solution of the present application essentially or the part which contributes to the prior art or a part of the technical solution may be embodied in the form of a software product, and the computer software product is stored in a storage medium, and includes several instructions for enabling a computer apparatus (which may be a personal computer, a server, or a network device, etc.) to execute all or some steps of the method described in each embodiment of the present application. The foregoing computer-readable storage medium includes physical volatile and non-volatile, removable and non-removable media implemented in any manner or technology of storing information such as computer-readable instructions, data structures, program modules or other data. The computer-readable storage medium specifically includes, but is not limited to, a USB disk, a mobile hard disk, a read-only memory (ROM), a random access memory (RAM), an erasable programmable read-only memory (EPROM), an electrically erasable programmable read-only memory (EEPROM), a flash memory or another solid state memory technology, a CD-ROM, a digital versatile disk (DVD), an HD-DVD, a Blue-Ray or other optical storage devices, magnetic tape, magnetic disk storage or other magnetic storage devices, or any other media that may be used to store required information and may be accessed by a computer.

The above embodiments are merely used to describe the present application, instead of limiting the present application; various alterations and variants may be made by those of ordinary skill in the art without departing from the spirit and scope of the present application, so all equivalent technical solutions also belong to the scope of the present application, and the scope of patent protection of the present application should be defined by claims.

What is claimed is:

1. A method, comprising:
    detecting, by a device comprising a processor, an abnormality in changes of wireless energy transmission intensity in a phase calibration stage between a wireless energy sending device and a wireless energy receiving device; and
    notifying the wireless energy sending device of the abnormality in response to the detecting the abnormality.

2. The method of claim 1, wherein the detecting the abnormality in the changes of wireless energy transmission intensity comprises:
    detecting the abnormality based on a change trend of the changes of the wireless energy transmission intensity.

3. The method of claim 2, wherein the change trend is reflected through a change curve representing the changes of the wireless energy transmission intensity, and
    the detecting the abnormality in the changes of wireless energy transmission intensity comprises:
    determining that the abnormality has been detected in response to determining that a slope change of the change curve has exceeded a first threshold.

4. The method of claim 1, wherein the detecting the abnormality in the changes of wireless energy transmission intensity comprises:
    detecting the abnormality based on a position of the wireless energy receiving device and an ideal wireless energy transmission intensity change trend corresponding to the position.

5. The method of claim 4, further comprising detecting the position of the wireless energy receiving device.

6. The method of claim 4, wherein the ideal wireless energy transmission intensity change trend is reflected through an ideal wireless energy transmission intensity change curve, and
    the detecting abnormality in changes of wireless energy transmission intensity comprises:
    determining that the abnormality has been detected in response to determining that a difference between an actual wireless energy transmission intensity value and a corresponding value in the ideal wireless energy transmission intensity change curve has exceeded a second threshold.

7. The method of claim 1, further comprising:
    notifying at least one other wireless energy sending device in addition to the wireless energy sending device of the abnormality.

8. The method of claim 7, wherein the notifying the wireless energy sending device and the at least one other wireless energy sending device of the abnormality comprises notifying via broadcasting abnormality.

9. A method, comprising:
    receiving, by a device comprising a processor from a wireless energy receiving device, a wireless energy transmission intensity in a phase calibration stage between a wireless energy sending device and the wireless energy receiving device; and
    detecting an abnormality in changes of the wireless energy transmission intensity.

10. The method of claim 9, wherein the detecting the abnormality in changes of the wireless energy transmission intensity comprises:
    detecting the abnormality based on a change trend of the changes of the wireless energy transmission intensity.

11. The method of claim 10, wherein the change trend is reflected through a change curve representing the changes of the wireless energy transmission intensity, and
    the detecting the abnormality in the changes of the wireless energy transmission intensity comprises:
    determining that the abnormality is detected in response to determining that a slope change of the change curve has exceeded a first threshold.

12. The method of claim 9, wherein the detecting the abnormality in the changes of the wireless energy transmission intensity comprises:
 detecting the abnormality based on a position of the wireless energy receiving device and an ideal wireless energy transmission intensity change trend corresponding to the position.

13. The method of claim 12, further comprising receiving position information of the wireless energy receiving device.

14. The method of claim 12, wherein the ideal wireless energy transmission intensity change trend is reflected through an ideal wireless energy transmission intensity change curve, and
 the detecting the abnormality in the changes of the wireless energy transmission intensity comprises:
 determining that the abnormality is detected in response to determining that a difference between a value of the wireless energy transmission intensity and a corresponding value in the ideal wireless energy transmission intensity change curve has exceeded a second threshold.

15. The method of claim 9, further comprising:
 making the wireless energy sending device operate asynchronously with other wireless energy sending devices.

16. A device, comprising:
 a processor, coupled to a memory, that executes or facilitates execution of executable modules, comprising:
 a detection module configured to detect abnormality in changes of wireless energy transmission intensity in a phase calibration stage between a wireless energy sending device and a wireless energy receiving device; and
 a notification module configured to notify the wireless energy sending device of the abnormality in response to the abnormality.

17. The device of claim 16, wherein the detection module is configured to:
 detect the abnormality based on a change trend of the changes of the wireless energy transmission intensity.

18. The device of claim 17, wherein the change trend is reflected through a change curve representing the changes of the wireless energy transmission intensity, and
 the detection module is specifically configured to:
 determine that the abnormality is detected in response to a determination that a slope change of the change curve has exceeded a first threshold.

19. The device of claim 16, wherein the detection module is configured to:
 detect the abnormality based on a position of the wireless energy receiving device and an ideal wireless energy transmission intensity change trend corresponding to the position.

20. The device of claim 19, wherein the executable modules further comprise:
 a position detection module configured to detect the position of the wireless energy receiving device.

21. The device of claim 19, wherein the ideal wireless energy transmission intensity change trend is reflected through an ideal wireless energy transmission intensity change curve, and
 the detection module is configured to:
 determine that the abnormality is detected in response to determining that a difference between an actual wireless energy transmission intensity value and a corresponding value in the ideal wireless energy transmission intensity change curve has exceeded a second threshold.

22. The device of claim 16, wherein the notification module is further configured to:
 notify at least one other wireless energy sending device in addition to the wireless energy sending device of the abnormality.

23. The device of claim 22, wherein the notification module is configured to:
 notify the wireless energy sending device and the at least one other wireless energy sending device of the abnormality via broadcasting.

24. A device, comprising:
 a processor, coupled to a memory, that executes or facilitates execution of executable modules, comprising:
 a receiving module configured to receive, from a wireless energy receiving device, wireless energy transmission intensity in a phase calibration stage between a wireless energy sending device and the wireless energy receiving device; and
 a detection module configured to detect an abnormality in changes of the wireless energy transmission intensity.

25. The device of claim 24, wherein the detection module is configured to:
 detect the abnormality based on a change trend of the changes of the wireless energy transmission intensity.

26. The device of claim 25, wherein the change trend is reflected through a change curve representing the changes of the wireless energy transmission intensity, and
 the detection module is configured to:
 determine that the abnormality is detected in response to determining that a slope change of the change curve has exceeded a first threshold.

27. The device of claim 24, wherein the detection module is configured to:
 detect the abnormality based on a position of the wireless energy receiving device and an ideal wireless energy transmission intensity change trend corresponding to the position.

28. The device of claim 27, wherein the receiving module is further configured to:
 receive position information of the wireless energy receiving device.

29. The device of claim 27, wherein the ideal wireless energy transmission intensity change trend is reflected through an ideal wireless energy transmission intensity change curve, and
 the detection module is configured to:
 determine that the abnormality is detected in response to determining that a difference between a value of the received wireless energy transmission intensity and a corresponding value in the ideal wireless energy transmission intensity change curve has exceeded a second threshold.

30. The device of claim 24, wherein the executable modules further comprise:
 an asynchronous module configured to make the wireless energy sending device operate asynchronously with other wireless energy sending devices.

31. A non-transitory computer readable device comprising executable instructions that, in response to execution, cause a device comprising a processor to perform operations, comprising:
 detecting an abnormality in changes of intensity data representing a wireless energy transmission intensity in a phase calibration stage between a wireless energy sending device and a wireless energy receiving device; and notifying the wireless energy sending device of the abnormality in the case that the abnormality has been detected.

32. A non-transitory computer readable device comprising executable instructions that, in response to execution, cause a device comprising a processor to perform operations, comprising:

receiving, from a wireless energy receiving device, intensity data representing a wireless energy transmission intensity in a phase calibration stage between a wireless energy sending device and the wireless energy receiving device; and detecting an abnormality in changes of the intensity data representing the wireless energy transmission intensity.

* * * * *